METHOD OF PRODUCING EPITAXIAL LAYERS
ON SEMICONDUCTOR MONOCRYSTALS

Filed Nov. 21, 1962 2 Sheets-Sheet 1

Sept. 26, 1967 E. SIRTL ETAL 3,344,002

METHOD OF PRODUCING EPITAXIAL LAYERS ON SEMICONDUCTOR MONOCRYSTALS

Filed Nov. 21, 1962 2 Sheets-Sheet 2

United States Patent Office 3,344,002
Patented Sept. 26, 1967

3,344,002

METHOD OF PRODUCING EPITAXIAL LAYERS ON SEMICONDUCTOR MONOCRYSTALS

Erhard Sirtl, Munich, and Hansjürgen Dersin, Ottobrunn, near Munich, Germany, assignors to Siemens & Halske Aktiengesellschaft, Berlin, Germany, a corporation of Germany Filed Nov. 21, 1962, Ser. No. 239,200
Claims priority, application Germany, Nov. 24, 1961, S 76,815
19 Claims. (Cl. 148—175)

Our invention relates to methods of producing epitaxial layers on semiconductor monocrystals for purposes such as increasing the thickness of the crystals, doping the crystals or zones thereof, or for producing p-n junctions thereupon.

In a more particular aspect, our invention relates to improvements in the production of epitaxial layers upon ribbon-shaped semiconductor dendrites, as described in our coassigned copending application Serial No. 216,501, filed August 13, 1962, now U.S. Patent No. 3,306,703.

According to the method of the copending application just mentioned, dendritic monocrystals of $A^{III}B^{V}$ semiconductor compounds can be directly produced by transport reactions from the gaseous phase, and these dendrites can then be divided into pieces to be employed as starting members in the production of electronic semiconductor devices. The method is carried out by forming a highly heated reaction gas mixture within a reaction vessel, rapidly and intensely super-cooling a portion of this reaction vessel and the gas mixture contained therein about 100° C. to initiate the growth of a dendrite on the wall of the reaction vessel, and maintaining a steep temperature and concentration gradient of the reaction components within the reaction vessel during the dendritic growth. As a result, ribbon-shaped dendritic monocrystals are produced which have a given conductance and a given conductance type depending upon the starting materials employed.

Our invention relates generally to methods of the above-mentioned type, and has as an object to increase the thickness of the above-mentioned dendritic monocrystals in a single step of operation immediately after the dendrite production proper. To this end, and in accordance with a feature of our invention, we place, into a sealed heatable reaction vessel, the necessary starting materials in the quantity required for the formation of dendritic semiconductor monocrystals from a high-temperature equilibrium, in accordance with the principles of the preceding paragraph and, after production of the dendrites, we change the precipitation conditions within the reaction vessel so that further precipitation, of the semiconductor material upon the surface areas of the dendrites, takes place virtually only epitaxially.

According to another feature of our invention, the above-described method is modified by adjusting the precipitation conditions in the reaction vessel, after formation of the dendritic semiconductor monocrystals, so that the further precipitation of the semiconductor material takes place substantially only by epitaxial growth on the 111-surfaces of the dendrites.

For performing the method, the starting materials are placed into the reaction vessel, preferably a quartz tube, which is then sealed on both ends, for example by fusing. The ribbon-shaped dendritic semiconductor monocrystals are then produced by gas transport reaction. This is done in the manner described above and more fully described in the above-mentioned copending application Serial No. 216,501. The next following method step, immediately following the dendrite production, resides in controlling the transport reaction through the gaseous phase in such a manner that there exists a sufficient concentration gradient in the direction toward the dendritic growth within the starting material now in the gaseous phase, and in adjusting the precipitation conditions at the dendrite itself so that semiconductor material is precipitated from the gaseous phase virtually only by epitaxial growth on the dendrites. Precipitation virtually only by epitaxial growth on the dendrite is characterized by the fact that the starting material is preponderantly precipitated upon the broad surfaces of the ribbon-shaped dendrites which thus increase in thickness, whereas neither the length nor the width of the dendrites is appreciably increased by precipitation of semiconductor material in this stage of crystalline growth. The operating conditions can be adjusted, by suitable adaptation of the concentration gradient in the reaction space, so that during precipitation of semiconductor material upon dendrites consisting of binary semiconductor compounds. The starting material, consisting of at least two components and being transported via the gaseous phase, is precipitated epitaxially on the less noble side of the dendrite, namely on the side at which the less noble one of the components is a direct surface constituent of the semiconductor crystal lattice.

According to another feature of our invention, the method is modified by introducing into the reaction vessel, aside from the above-mentioned semiconductor starting materials, at least one doping material. By variation in concentration of the dopant material or materials in the gaseous phase, various quantities of doping materials can be entered into the gas transportation and can thus be co-deposited by subsequent epitaxial precipitation upon the dendrite monocrystals.

When performing the method, the starting materials and any added doping materials are preferably caused to convert to the gaseous phase by employing a heatable reaction vessel in which respectively different portions of the interior can be adjusted to different temperatures in accordance with the desired temperature distribution. This vessel is supplied, in the proper portions of the interior, with starting and doping material for the production of dendrites and the subsequent development of these dendrites into thicker semiconductor monocrystals. After termination of the dendritic growth, caused by local supercooling and corresponding supersaturation, the temperature ($T_{II}$) in the vessel portion containing the starting materials is maintained or slightly reduced below the temperature ($T_{III}$) of the vessel portion in which the dendritic growth has taken place. Simultaneously the temperature ($T_{III}$) in the latter vessel portion is maintained at the value required for dendrite production. In this manner, the starting materials, transported via the gaseous phase, grow predominantly epitaxially on the surfaces of the dendrite monocrystals without appreciably increasing the length or changing the crystalline structure thereof.

The method of the invention is applicable for the production of junctions on semiconductor monocrystals of $A^{II}B^{VI}$ and $A^{III}B^{V}$ compounds. In the same manner, the invention is applicable for the production of junctions of monocrystals formed of elements from group IV*b* of the periodic system, particularly those possessing given properties obtained by previous doping.

The invention will be further described and explained with reference to the accompanying drawings in which.

Figure 1:
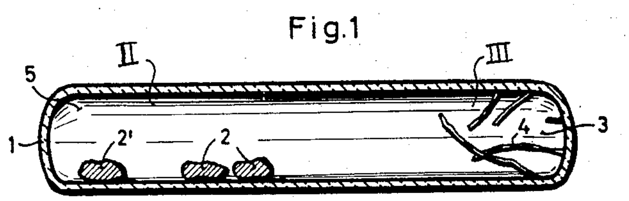
FIG. 1 shows schematically, in section, a processing vessel during performance of the crystal-growing method according to the invention.

According to FIG. 1, a tubular quartz vessel 1, fused off and sealed at both ends, contains in one of its two portions II and III, the starting materials 2 and the doping material 2' in solid form. The vessel is shown at the stage in which, in portion III, a number of ribbon-shaped dendrites 4 have been produced at the vessel end 3 remote from the starting material. When producing the dendrites from a semiconductor compound, such as an $A^{III}B^{V}$ compound, for example GaAs, GaP, InAs, the starting materials 2 consist, for example, of a mixture of the pulverulent elemental constituents. Also in the case of such $A^{III}B^{V}$ semiconductor compounds the doping material 2' may consist, for example, of cadmium or zinc; these substances have acceptor action and may be employed for reversely doping n-type GaAs in order to produce a p-n junction, for example.

Figure 2:
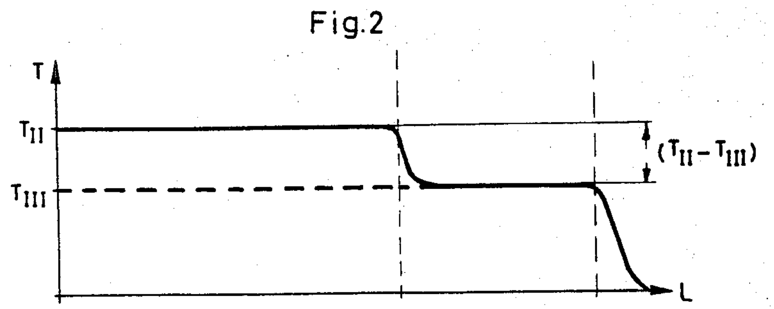
FIG. 2 is an explanatory graph indicating the temperature distribution in the tubular processing vessel of FIG. 1 versus the tube length.

The temperature distribution in the quartz tube 1 is apparent from the graph shown in FIG. 2, in which the abscissa denotes the length L of the tube and the ordinate indicates temperature T. The temperature obtaining in the vessel portion II is denote by $T_{II}$, and the temperature obtaining in the vessel portion III, where the dendrites 4 are located, is denoted by $T_{III}$. The intersection of abscissa and ordinate, however, does not correspond to zero temperature but indicates the finite temperature value, for example 800° C. for $T_{II}=1000°$ C., which temperature is applicable, for example, in the production of GaAs dendrites as will be more fully described hereinbelow.

The temperature $T_{II}$ in vessel portion II containing the starting and doping materials 2 and 2' respectively produces an equilibrium condition of the reaction partners. This condition is displaced in the vessel portion III of the lower temperature $T_{III}$ for example of 800 to 900° C. in such a sense that an epitaxial growth of semiconductor compound on the previously precipitated dendrite monocrystals takes place by transport of starting or doping material through the gaseous phase at a concentration gradient which is low in comparison with the conditions obtaining during the preceding growth of the dendrites.

When operating with binary semiconductor monocrystals, as is the case with the $A^{III}B^{V}$ examples mentioned above, the method is preferably further improved by adjusting the temperature difference $T_{II}-T_{III}$ in the reaction vessel, after formation of the dendrites, to such a value that the concentration gradient between the vessel portions II and III is so slight that the starting materials transported via the gaseous phase are epitaxially precipitated on the 111-surfaces of the dendrite monocrystals. For obtaining a purely epitaxial precipitation exclusively on the 111-surfaces of dendrite monocrystals of a binary semiconductor compound, the temperature difference $T_{II}-T_{III}$ is suitably chosen, particularly by slightly reducing the temperature $T_{II}$ in the material-containing vessel portion, so that the concentration gradient is likewise reduced with the effect that the molecules of the starting material available from the gaseous phase can become precipitated without disturbance at the localities most favorable to such precipitation from energy viewpoints, namely at the 111-surfaces. Aside from generally thickening the ribbon shaped monocrystals while simultaneously doping them and completely preserving their crystal structure, the method according to the invention thus also affords limiting the epitaxial precipitation to one crystal phase and to thereby obtain an essentially unilateral enlargement of the starting crystal without appreciable change in either length or width.

The electronic performance of rectifiers, transistors and other semiconductor devices is predicated upon phenomena occurring in junctions between crystal regions of respectively different type of conductance. The method according to the invention affords an epitaxial production of such semiconductor monocrystals having junctions between regions of respectively different specific conductance and/or different type of conductance. For this purpose, we place into the reaction vessel, aside from the starting materials, at least one doping material and, after sealing the vessel, adjust the precipitation conditions so that after the growth of the dendrites the precipitation is continued epitaxially with the doping content needed to impart to the precipitating layer a conductance or type of conductance different from that of the dendritic substratum. This requires that, upon completion of the above-described production or thickening of dendritic monocrystals, the concentration of doping material in the gaseous phase is increased or new doping material is introduced into the gaseous phase with the result that an increased transport into the precipitation region of the vessel takes place with a resulting increase in concentration of the dopant in the growing layer or region of the semiconductor monocrystal. In principle, such junctions can be produced in the following ways:

(1) Varying the dissolving rate of the starting material, (2) Varying the quantity of a component contained in the gaseous phase, by depletion or consumption of that component in the starting substance, (3) Varying the temperature in the individual portions of the reaction vessel.

An embodiment of the processing mode (1) resides in using the material of the one conductance type in compact constitution but the material of the other conductance type in fine distribution, such as in form of a powder, whereby, after the more rapid consumption of the pulverulent component, a reverse doping effect takes place. According to a modification of this mode of operation, material of the one conductance type is placed into a tube open at both ends and located within the fully closed and sealed reaction vessel, whereas the material of the other conductance type is located within the vessel in a tube open at only one side, so that after formation of the dendrites the material transport, upon dissolution of the more easily accessible substance, is effected by the component located in the unilaterally open tube.

When performing the method in accordance with the above-mentioned mode (2), a lattice disturbance element (dopant) is accommodated in the reaction vessel together with the other materials, whose dopant concentration in the gaseous phase during dendritic growth already declines to such an extent that the fundamental doping of the semiconductor material becomes dominating in the course of the epitaxial precipitation.

For performing the last-mentioned mode of operation (3), a sealed heatable reaction vessel is used in which different temperatures are adjustable in respect to the different vessel regions. After termination of the dendrite production, the temperature $T_{I}$ in the vessel portion containing the material of different conductance type and/or different conductance is increased above the temperature $T_{II}$ in the vessel portion that contains the starting materials from which the dendrite monocrystals are produced. This temperature is made sufficiently large and maintained for a sufficiently long period of time that the occurring transportation of doping material through the gaseous phase to the dendrite suffices for the desired change in doping of the crystal region now being epitaxially precipitated. Simultaneously, the temperature $T_{II}$ in the vessel portion containing the starting material for the dendrites is so adjusted and maintained that a further transportation of the starting material, converted to the gaseous phase, toward the dendrites takes place without fully consuming the starting material. Also simultaneously the temperature $T_{III}$, in the vessel portion containing the dendrites, is so adjusted and maintained that the starting and doping materials being transported via the gaseous phase are precipitated upon the surfaces of the dendrite monocrystals predominantly epitaxially without appreciably increasing the length of the dendrites and changing their crystalline structure. According to this method of the invention, therefore, a single operating step, immediately following the production and thickening of the dendrites, results in the growing of a crystalline layer epitaxially upon the dendrites and giving this layer a type of conductance different from the dendritic substratum thus producing a p-n junction, simply by varying the temperature distribution in the reaction vessel and thus causing a control transport of the reversely doping material via the gaseous phase.

The reaction vessel, preferably a quartz tube as shown in FIG. 1, after being provided with the necessary reaction material, which for the production of gallium arsenide GaAs, for example, could consist of gallium arsenide and iodine, is first heated to a temperature sufficiently high to have a portion of the material convert from the solid to the gaseous stage. This temperature could be, for example, about 1000° C. The resulting gas mixture consists of $GaI_3$, 3GaI and $As_2$ which forms according to the equation $$2(GaAs)+(GaI_3)\leftrightarrows 3(GaI)+(As_2)$$

from the solid gallium arsenide supply and consumes only a portion thereof. After obtaining the equilibrium of the gas corresponding to the temperature of about 1000° C., a supply of gallium arsenide remains present. This gallium arsenide, too, serves for the growth of a dendrite to furnish semiconductor material according to the above-mentioned equation for the formation of the reaction components. Thereafter one portion of the reaction vessel III is cooled to a considerably lower temperature, for example about 800° C. This results in that the gas present in the area thereof is intensely supercooled at the vessel wall portion and greatly disturbs the previously mentioned equilibrium. As a result thereof, semiconductor material precipitates and since the supercooling is at least 100° C., dendrites now begin to grow approximately perpendicular to the wall at the end of the vessel III.

After dendrites are produced in this manner, the portion of the reaction vessel in which the material for reverse doping is located, is heated to a higher temperature so that the concentration of the latter material in the gaseous phase is increased, while simultaneously the vessel portion in which the dendrites were previously produced is kept at the temperature required for dendrite production. The molecules of the reverse doping material and of the starting material for dendrite production, carried by convection into the colder portion of the reaction vessel, cause in that vessel portion the occurrence of supersaturation.

However, since now the departure from the equilibrium is only slight (after elimination of the high initial supersaturation, due to the growth of the dendrites), such supersaturation is now eliminated by occurrence of epitaxial growth. That is, the material now precipitates in form of a layer upon the dendrite ribbons while following the crystalline structure of the monocrystal without changing the length of these ribbons. As a result, the thickness of the dendrite ribbons increases.

The magnitude of the concentration gradient is determining for the rate of epitaxial growth within a further range; if the concentration gradient exceeds a certain value, then dendritic growth will take place. The magnitude of the concentration gradient with given reaction partners is determined only by the temperature difference in the reaction vessel, provided that in all stages of the process there remains a residue of a solid body on the vessel bottom ("bottom body") consisting of starting material and doping material respectively, and that the geometric dimensions of the vessel do not appreciably affect the convection processes by gas-flow impedances. Accordingly, the concentration of the reversely doping material in the epitaxially grown layer is determined by the temperature difference between reversely doping material and dendrites, on the one hand, as well as by the reversely doping material and the starting material, on the other hand. If, after dendrite production, the conversion of the starting materials to the gaseous phase is reduced by lowering the temperature of the vessel portion, containing the starting materials; and if simultaneously the vaporization of the reverse dopant material is correspondingly increased by greatly raising the temperature of the vessel portion, containing the dopant materials; then abrupt epitaxially grown junctions result over the entire length of the dendrites, and the dopant concentration in these junction layers can be increased up to degeneration concentration by suitable choice of the temperatures. Such abrupt junctions and extreme dopant concentrations are desirable, for example, in tunnel diodes.

The mode of operation affords the advantage, in comparison with those mentioned above under (1) and (2), that junctions of predetermined properties can be reliably reproduced with this method, while requiring knowledge only of the ratio in which the individual dopant elements used are built into the crystal lattice relative to the starting material, whereas the method when performed according to modes (1) and (2) requires accurate knowledge of the absolute values of the material transport per unit of time, and hence is greatly dependent upon the geometry of factors determined by the processing equipment used. The further regulation or control of the method, as long as a bottom body is present, can be effected exclusively by temperature adjustment. If desired, the epitaxial growth can be continued for some time for the purpose of thickening the dendrite ribbon prior to commencing the reverse doping by increasing the vapor pressure of the material that determines the change in type of conductance.

The above-described method according to the invention thus differs advantageously in various respects from known methods of producing junctions on monocrystalline substrates by epitaxial growth of material having a different conductance type and being precipitated from the gaseous phase. Among these advantages and novel objectives achieved by the invention is the fact that several operations become superfluous. For example, the pretreating of monocrystalline carrier wafers by cutting them to size, the provision of a crystallographically clean surface for the subsequent etching and polishing required before the epitaxial growth can commence, are no longer needed; the crystal seeds for epitaxial growth, namely monocrystalline wafers, need not be placed into the reaction vessel only after they are previously produced elsewhere; the production of the monocrystalline substrates or carriers as well as of the p-n junctions rather takes place in one and the same reaction vessel in a singe course of operation.

When employing the method of the invention with crystals having zinc blend structure, it is preferable to adjust the above-mentioned temperature differences ($T_{II}$—$T_{III}$) and ($T_I$—$T_{III}$) to such values that the concentration gradients between the vessel portions containing the starting or doping substances, on the one hand, and the dendrite, on the other hand, are sufficiently slight to have the gas-transported starting and doping materials epitaxially precipitated upon the 111-surfaces of the dendrite monocrystals. Such zinc blend lattices are peculiar for example to GaP, InP, GaAs, InAs, these being the III–V semiconductor compounds that can be processed in accordance with the invention; and the same type of lattice is inherent in various other semiconductor compounds to which the invention is applicable, for example II–VI semiconductor compounds such as the compounds of Zn, Cd and Hg with S, Se and Te to which the invention is likewise applicable. With respect to such compounds having a zinc blend crystal lattice reference may be had to Solid State Physics, edited by F. Seitz and D. Turnbull, vol. 3 published by Academic Press Inc., New York, 1956, pages 3 to 5.

The method of the invention, described in principle above, will be further elucidated by means of an example concerning the production of n-type gallium arsenide dendrites with epitaxially grown layers of p-type material forming an abrupt p-n junction, the method being analogously applicable to the various other semiconductor crystals mentioned in this specification.

Figure 3:
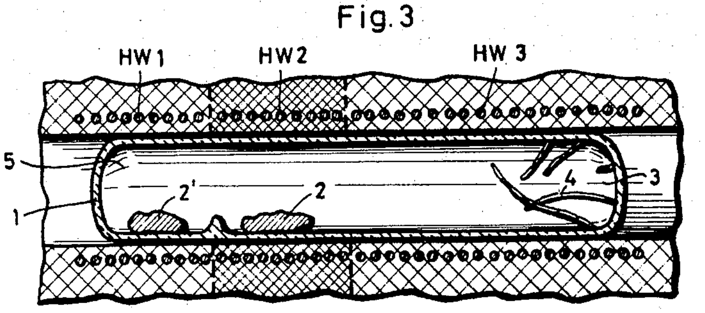
FIG. 3 shows schematically, and in section, another processing vessel with appertaining heating devices during crystal-growing operation.

Shown in FIG. 3 is a reaction vessel of tubular shape consisting of quartz and having a relatively large cross section in comparison with the quantities of material placed therein. Prior to fusing and sealing the ends of the quartz tube, it is provided with two amounts of differently doped gallium arsenide 2 and 2' having n-type and p-type conductance respectively. The two amounts are prevented from directly touching each other, by means of a small projection formed by the vitreous wall of the vessel. The atmosphere in the vessel contains halogen which is supplied either in gaseous form or, for example in the case of iodine, by sublimating it into the vessel. The quartz tube is surrounded by three electric heater windings HW1, HW2 and HW3 which can be operated independently of each other for heating the respective vessel portions I with the material 2' for reverse doping, the vessel portion with the starting material 2 for the dendrites, and the vessel portion III in which the dendrites 4 are to be produced. When starting the operation, the entire length of the quartz tube is uniformly heated to a temperature sufficiently high to convert a portion of the enclosed substances into the gaseous phase. A temperature of about 1000° C. is suitable for this purpose with respect to the example of gallium arsenide here being described. Such uniform heating is maintained until equilibrium conditions are attained.

Figure 4:
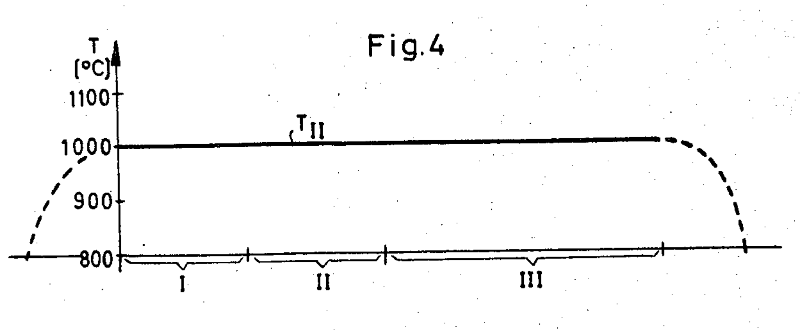
FIG. 4 is an explanatory graph of the temperature distribution versus the length of the tubular vessel as shown in FIG. 3.

The temperature distribution during this stage of operation is represented in FIG. 4. The abscissa denotes the length of the tube, corresponding to the graph described above with reference to FIG. 2, and the ordinate denotes temperature in degree C. Indicated in FIG. 4 by I, II and III are the vessel portions heated by the respective heater windings HW1, HW2 and HW3.

Figure 5:
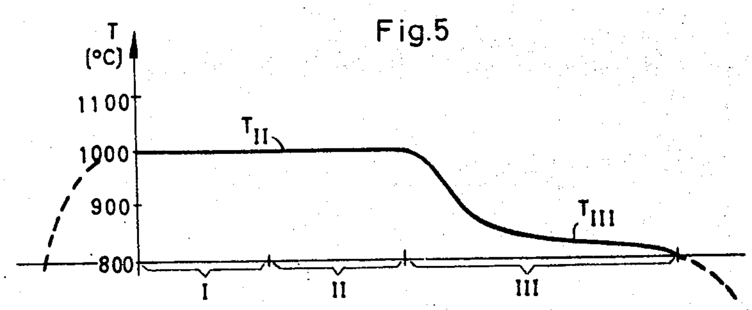
FIG. 5 is another explanatory graph relating to the same processing vessel but showing the temperature distribution during the developing stage of the dendrites.

After the entire contents of the tube is heated to the above-mentioned high temperature (about 1000° C.) as indicated by $T_{II}$ in FIG. 4, the conditions required at the tube end 3 in vessel portion III for the growth of dendrites are provided by suddenly cooling this vessel portion by correspondingly reducing the electric energization of the heater winding HW3. The sudden reduction in temperature is 100 to 200° C. and the rate of reduction 10 to 100° C. per minute. The corresponding temperature distribution in the quartz tube during the production of the dendrites is shown in FIG. 5 which indicates the same designation as FIG. 4. It has been found particularly advantageous to introduce hydrogen into the reaction vessel prior to segregation of the dendrites because this has the effect of accelerating the growth of the GaAs dendrites 4. That is, the presence of hydrogen displaces the disproportioning reaction toward the formation of GaAs and such displacement is retained irrespective of whether or not after the dendrite production the crystals are subjected to doping by transport of dopant material through the gaseous phase.

Figure 6:
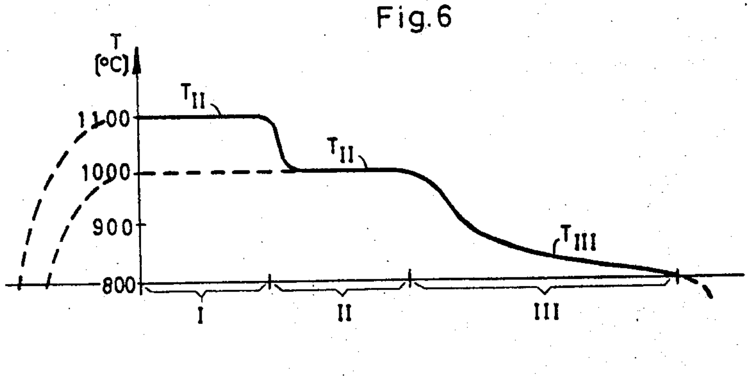
FIG. 6 is a further explanatory graph also relating to FIG. 4 but showing the temperature distribution in the reaction vessel during a subsequent stage of the method.

Under the above-mentioned conditions, the ribbon-shaped dendrites 4 are produced within a period of approximately 1 minute. Thereafter the temperature near the other end 5 of the tube in the vessel portion I containing the reversely doped GaAs 2' is increased about 100° C. up to about 1100° C., by correspondingly increasing the supply of current to the heater winding HW1. FIG. 6 shows, in a manner analogous to FIGS. 4 and 5, the temperature distribution in the vessel in this stage of the process.

Due to this increase in temperature, the concentration gradient between vessel portions I and III is augmented so that an increased transport of the gasified material 2' in portion III takes place. In vessel portion III the materials 2 and 2' are precipitated from the gaseous phase upon the dendrites 4 in form of an epitaxial layer which grows upon each dendrite and corresponds to the crystal lattice of the dendrite. The precipitated quantity of the reversely doped material 2' is larger than that of the starting material 2 because the temperature and hence the vapor pressure of the reversely doped material 2' in this stage of the process is greater under the above-mentioned conditions than the vapor pressure of the starting material 2 previously active during the production of the dendrites. The epitaxial growth occurs predominantly on the broad sides of the ribbon-shaped dendrites so that their length is not appreciably changed. When selecting the temperatures in the tubular processing vessel as follows:

Temperature $T_I$ in vessel portion I=about 1100° C.
Temperature $T_{II}$ in vessel portion II=about 1000° C.
Temperature $T_{III}$ in vessel portion III=about 800° C., a further transport of starting material in vessel portion III takes place so that starting material continues to be precipitated upon the dendrite monocrystals. However, since the original condition of supersaturation is eliminated by cooling and subsequent growth of dendrites, the precipitation now takes place preferentially in epitaxial form so that mainly the thickness and to a slight extent also the width of the ribbon dendrites increases. With a suitable concentration of dopant, for example zinc, in gallium arsenide, the mount of p-type material thus epitaxially precipitated compensates the original n-type of the dendrites so that the GaAs in the growing layer assumes p-type conductance.

Figure 7:
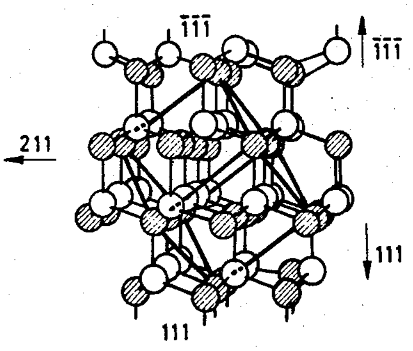
FIG. 7 is a diagrammatic representation of a gallium-arsenide crystal lattice for explanatory purposes.

When the weighed-in quantities are so chosen that there is always a solid bottom body in the processing vessel during all stages of the process, the epitaxially grown layers assume a thickness of approximately 10 microns within a period of about 10 minutes, these layers extending over the entire length of the ribbon-shaped dendrites with a uniform type of conductance and in uniform thickness. In the case of GaAs the ribbon-shaped dendrite monocrystals, grown in the 211-direction, possess a twin plane on whose two sides the further growth of material can occur in the 111-direction or $\overline{111}$-direction during the epitaxial stage of the p-n junction production. In FIG. 7, showing diagrammatically a crystal lattice of GaAs and indicating Ga atoms by hatching in distinction from As atoms, it is shown that gallium atoms are located on a 111-surface whereas arsenic atoms are located at the $\overline{111}$-surface. With a suitable adjustment of the precipitation conditions, as exemplified and explained above, the precipitation of reversely doping materials, such as Zn or Cd from the p-type GaAs, takes place preferentially at the $\overline{111}$-surface. As a result, the layer epitaxially grown on this side of the twin plane contained in the dendrite is then more strongly p-conducting than the other side of the dendrite on which no or at best a minimal epitaxial precipitation takes place. The precipitation conditions resulting in precipitation upon only one crystal surface are determined by a moderate concentration of the doping and/or reversely doping material in the gaseous phase and by observing a not-too-high temperature gradient between the vessel portion containing the doping material and the vessel portion in which the precipitation takes place, so that the concentration gradient remains low enough for undisturbed and continuous epitaxial growth on only one side of the dendrite. By means of the method described of reversely doping from the gaseous phase, there have been produced p-n junctions on GaAs dendrite monocrystals with the following dimensions: length: a few cm., width: up to about 5 mm., thickness: 50 to 1000 microns, epitaxial layers in a thickness from a few up to several 100 microns.

The above-mentioned temperature and temperature distributions can be varied within the limits of several 10° C.; excessively high temperatures in vessel portion III cause conversion of the crystallographically instable dendrites into other stable crystalline forms.

The only two variables in the performance of the method, aside from the geometric relations and weighed-in quantities of materials, are the time factors and the temperature distribution in the reaction vessel. According to a modification of the method, as much starting and reversely doping material is placed into the reaction vessel as is required to retain bottom bodies of starting and doping material throughout the entire performance. The degree of doping can then be additionally modified by varying the partial pressure of the individual substances, which can also be effected by increasing or decreasing the temperature in the vessel portions containing the doping materials.

As described, the temperature adjustment and distribution in the performance of the method can readily be controlled by varying the supply of electric current to at least two mutually independent heater windings surrounding the reaction vessel. However, the method is not necessarily dependent upon the use of such separately operable electric heaters. Also applicable is a furnace in which a temperature gradient can be adjusted between respective portions of the furnace interior. The method can then be performed, for example, by first heating the reaction vessel in a furnace portion where the entire vessel is heated uniformly to the same temperature. Thereafter the vessel is displaced in the furnace into a region possessing an intensive temperature gradient as required for the production of dendrites. Thereafter the reaction vessel is moved to a region of different temperature distribution so that the vessel portion containing the doping material is located in a region having a temperature $T_I$ higher than the temperature $T_{II}$ required for the dendrite production, whereas simultaneously the vessel portion with the dendrite monocrystals is maintained approximately at the temperature $T_{III}$. When employing a unilaterally open furnace, the above-described temperature control is preferably effected by displacing the reaction vessel toward the open portion of the furnace so that the vessel portion in which previously the dendrites were produced becomes located in the vicinity of the furnace opening. Furthermore, cold air can be blown into the furnace opening for accelerating the cooling in the case of reverse doping, and also for accelerating the cooling of the middle portion of the reaction vessel during epitaxial growth.

In a method according to the invention, the above-described epitaxial precipitation stage can be repeated one or several times for the purpose of successively growing several layers of respectively different specific conductance and/or conductance type upon the dendrite monocrystals. For this purpose, one proceeds by repeating the temperature increase up to $T_I$ and subsequently reducing the temperature to $T_{II}$ in the vessel portion containing the doping material while simultaneously maintaining the temperature $T_{II}$ in the vessel portion containing the starting material or lowering the latter temperature to a value smaller than $T_{II}$ and subsequently increasing that temperature up to, or above, the value $T_{II}$. The temperatures of starting material and doping material, after production of the dendrites, are repeatedly displaced relative to each other in time sequence by approximately equal amounts, and each time the concentration of the epitaxially precipitated material increases with the higher temperature. Consequently, this mode of operation affords alternately growing layers of different conductance type upon each other in a defined manner. After suitably joining such layers with contacts or electrodes, the resulting devices are applicable, for example, as four-layer semiconductor devices such as electronic switches of the semiconductor controlled rectifier type.

For the production of semiconductor monocrystals and/or junctions between regions of different conductance or type of conductance, according to the invention, different combinations of starting materials can be employed. For example in the case of semiconductor crystals made from $A^{III}B^{V}$ compounds as specified in the foregoing, the following starting materials are applicable (by halogen or halogen compounds we refer to I, Cl and Br):

(a) The $A^{III}B^{V}$ compound and a halogen, (b) The elements of the $A^{III}B^{V}$ compounds separately and a halogen, (c) A halide of the $A^{III}$ element, and the $B^{V}$ element, eg. $GaI_3+3GaI+As$, as more fully described in our copending application Serial No. 216,501, (d) A halide (halogenide) of the $B^{V}$ element and the $A^{III}$ element, (e) A halide (halogenide) at least of one of the two elements, as well as the two elements themselves.

When employing the method of the invention in the production of semiconductor crystals with or without junctions from $A^{II}B^{VI}$ compounds, the starting materials are analogously applicable in a variety of combinations, for example as follows:

(a) The $A^{II}B^{VI}$ compound of which the semiconductor monocrystal and/or the junctions consists, and also a halogen;

(b) The elements of the $A^{II}B^{VI}$ compound separately and a halogen, (c) A halide (halongenide) of the $A^{II}$ elment and the $B^{VI}$ element, (d) A halide (halogenide) of the $B^{VI}$ element and the $A^{II}$ element, (e) A halide (halogenide) at least of one of the two elements as well as the respective elements themselves.

The method of the invention also affords the production of monocrystals, particularly those with semiconductor properties, and/or junctions from elements of the fourth group, subgroup *b*, of the periodic system, e.g. Si and Ge. Suitable as starting material in this case are:

(a) An element of group IV*b* and a halogen.

(b) A halide (halogenide) of the semiconductor element and the element itself.

As mentioned above, the method according to the invention can be performed by using at least one dopant element alone or as an addition to a semiconductor starting material different from the dopant. The weighed-in quantity of dopant material in this case, as a rule, is considerably smaller than that of the starting material. As also described, doping can also be effected when performing the method of the invention by using as doping material one or more compounds of a dopant element alone or as an addition to semiconductor starting material. In this case the doping materials are either kept separate from the starting material in the reaction vessel or they are mixed together therewith so that doping takes place not later than when the epitaxial growth of the starting material upon the dendrite is effected.

As exemplified above, it is preferable to supply hydrogen into the reaction vessel, in addition to the halogen, because this modifies the disproportioning equilibrium between the reaction partners by the reduction action of hydrogen with the result of promoting the growth of the dendrites and affording a controlling influence upon the subsequent method steps, particularly the doping of the epitaxially growing layers. The method of the invention produces on the described ribbon-shaped dendrites junctions between regions of different conductance type and/or of different specific conductance in which the epitaxially grown layers possess thicknesses of a few one-thousandths mm. up to a few tenths of 1 mm. The thickness of the layer increases with the duration of the epitaxial precipitation. For a given period of time, the thickness of the layer decreases with an increase in transport of starting material via the gaseous phase, such increase in transport being obtainable particularly by increasing the concentration gradient and hence by correspondingly increasing the temperature difference between the vessel portion containing the starting material and the precipitation respectively.

As also explained, junctions between zones of respectively different conductance and/or type of conductance may be given dopant concentrations increased up to degeneration values. The increase in concentration on both sides of the junction is obtained by correspondingly increasing the concentration of the doping substances in the bottom bodies of starting material and doping material and in the gaseous phase.

Exemplary of the production of $A^{II}B^{VI}$ compounds is the production of zinc selenide which is further described hereinbelow: Zinc selenide either as a compound or as a mixture of stoichiometric quantities of the components is used as the starting material. Iodine is used as the transporting medium and is employed in a concentration of 5 mg./cm.$^3$. Zinc iodide, $ZnI_2$, is another suitable transporting medium. In this case a suitable concentration is 6 mg. $ZnI_2$/cm.$^3$. The temperature gradient required for this reaction is 1000/800° C. Halogens or halogen compounds suitable as transporting medium are chlorine, bromine and iodine or the corresponding compounds. Fluorine and fluorine compounds are not suitable. A halogen compound of one of the two components is a useful transporting medium. For example, zinc iodide is applicable in the production of zinc selenide.

Another example of our method concerning the production of gallium arsenide uses arsenic bromide, $AsBr_3$, in a concentration of 1 mg. $AsBr_3$/cm.$^3$ as the transporting medium. In this case, an addition of hydrogen is required at a partial pressure p=0.3. atmosphere. The temperature gradient in this example is 1100/900° C.

When producing gallium phosphide, it is preferable to use the compound as starting material. Stoichiometric quantities of the components can also be used but this is less favorable. In both cases it is preferable to employ HCl as transporting medium at a partial pressure of p=0.5 atmosphere. The temperature gradient should be 1150/900° C.

For producing germanium dendrites according to the method of the invention, the starting material consists of metallic germanium. The transporting medium employed is a mixture of hydrogen and steam. The partial pressure of hydrogen is 0.5 atmosphere, the concentration of the steam 0.1 mg./cm.$^3$ and the temperature gradient is 1000/800° C.

Arsenic and $As_2O_3$ are illustrative of n-doping materials and gallium and $Ga_2O_3$ are illustrative of p-doping materials relative to the elements of the fourth group of the periodic system. The transporting medium in these cases is $H_2/H_2O$.

Relative to $A^{III}B^{V}$ compound, suitable doping agents are selenium, tin, germanium, silicon or the corresponding halides for n-doping. Suitable p-dopants are zinc and cadmium. Employed as transporting medium are chlorine, bromine and iodine or their compounds.

Suitable doping materials for $A^{II}B^{VI}$ compounds are aluminum and indium for n-doping, and copper and silver for p-doping.

As used in the claims, the phrase "different conductance" refers to either type or magnitude.

Obviously many modifications and variations of the present invention are possible in the light of the above teachings. It is therefore to be understood that within the scope of the appended claims, the invention may be practiced otherwise than as specifically described.

We claim:

1. Method of producing semiconductor monocrystals by precipitation from the gaseous phase which comprises introducing starting materials into a sealed heatable reaction vessel in which different temperature distributions are adjustable, forming a highly heated reaction gas mixture within the reaction vessel, rapidly and intensely cooling a portion of the reaction vessel and the gas contained therein so that dendritic growth of semiconductor monocrystals ensues, after termination of the dendritic growth maintaining the temperature ($T_{II}$) in the vessel portion containing the starting material at a value slightly below the temperature ($T_{III}$) of the vessel portion in which the dendritic growth took place, and simultaneously maintaining the temperature ($T_{III}$) at the value required for dendrite production so that the starting materials transported via the gaseous phase grow predominantly epitaxially upon the surfaces of the dendrite monocrystals without appreciably changing their length and crystalline constitution.

2. Method of producing semiconductor monocrystals by precipitation from the gaseous phase which comprises introducing starting materials into a sealed heatable reaction vessel in which different temperature distributions are adjustable, forming a highly heated reaction gas mixture within the reaction vessel, rapidly and intensely cooling a portion of the reaction vessel and the gas contained therein so that dendritic growth of semiconductor monocrystals ensues, after termination of the dendritic growth adjusting the temperature difference between the temperature ($T_{II}$) in the vessel portion containing the starting material and the temperature ($T_{III}$) of the vessel portion in which the dendritic growth took place, so that the concentration gradient between the vessel portions with the starting and doping materials on the one hand and the dendrites on the other hand is so slight that the starting materials, being transported via the gaseous phase, are epitaxially precipitated upon the $\overline{111}$-surfaces of the dendrite monocrystals.

3. The method of producing semiconductor monocrystals by precipitation from the gaseous phase which comprises introducing starting materials in a portion of a sealed heatable reaction vessel and a material of different conductance into another portion of said reaction vessel, adjusting the precipitation conditions so as to produce dendritic semiconductor monocrystals, thereafter increasing the temperature ($T_I$) in the vessel portion containing the material of different conductance above the temperature ($T_{II}$) of the starting material for the dendritic monocrystals and maintaining this temperature ($T_I$), so that a transport sufficient for change in doping takes place with respect to the doping material converted to gaseous constitution and passing to the dendrites, simultaneously adjusting and maintaining the temperature ($T_{II}$) in the vessel portion containing the dendrite-producing starting material so that there occurs a further transport of gasified starting material to the dendrites without complete consumption of the starting material, also simultaneously adjusting and maintaining the temperature ($T_{III}$) in the vessel portion containing the dendrites so that the starting and doping materials transported via the gaseous phase grow predominantly epitaxially on the surfaces of the dendrite monocrystals without substantially changing their length and crystalline constitution.

4. The method of claim 3, wherein temperature differences $T_{II}-T_{III}$ and $T_I-T_{III}$ are so adjusted that the concentration gradients between the vessel portions with the starting and doping materials on the one hand and the dendrites on the other hand are so slight that the starting and doping materials, transported via the gaseous phase, are epitaxially precipitated upon the $\overline{111}$-surfaces of the dendrite monocrystals.

5. The method of producing semiconductor monocrystals by precipitation from the gaseous phase which comprises introducing starting materials in a portion of a sealed heatable reaction vessel and a material of different conductance into another portion of said reaction vessel, adjusting the precipitation conditions so as to produce dendritic semiconductor monocrystals, thereafter increasing the temperature ($T_I$) in the vessel portion containing the material of different conductance above the temperature ($T_{II}$) of the starting material for the dendritic monocrystals and maintaining this temperature ($T_I$), so that a transport sufficient for change in doping takes place with respect to the doping material converted to gaseous constitution and passing to the dendrites, simultaneously adjusting and maintaining the temperature ($T_{II}$) in the vessel portion containing the dendrite-producing starting material by a first heater winding surrounding the reaction vessel so that there occurs a further transport of gasified starting material to the dendrites without complete consumption of the starting material, also simultaneously adjusting and maintaining the temperature ($T_{III}$) in the vessel portion containing the dendrites by a second heater winding surrounding the reaction vessel so that the starting and doping materials transported via the gaseous phase grow predominantly epitaxially on the surfaces of the dendrite monocrystals without substantially changing their length and crystalline constitution.

6. Method of producing semiconductor monocrystals by precipitation from the gaseous phase which comprises introducing starting materials into a sealed heatable reaction vessel, heating the reaction vessel in a furnace zone of substantially uniform temperature, displacing the reaction vessel into a furnace zone having a large temperature gradient for the purpose of producing the dendrites, thereafter moving the reaction vessel into a zone having a different temperature distribution, such that the vessel portion with the doping material reaches a zone having a higher temperature ($T_I$) than the temperature ($T_{II}$) of the dendrite-production stage, while simultaneously keeping the zone with the dendrite monocrystals at about the temperature ($T_{III}$).

7. The method of producing semiconductor monocrystals by precipitation from the gaseous phase which comprises introducing starting materials in a portion of a sealed heatable reaction vessel and a material of different conductance into another portion of said reaction vessel, adjusting the precipitation conditions so as to produce dendritic semiconductor monocrystals, repeatedly increasing the temperature to ($T_I$) and subsequently reducing to ($T_{II}$) in the vessel portion containing the doping material while simultaneously maintaining the temperature of the vessel portion containing the starting material at a value not above ($T_{II}$), subsequently increasing the temperature at least to ($T_{II}$), repeating this temperature distribution several times, thus producing alternately several layers of respectively different conductance predominantly by epitaxial precipitation upon the dendrite monocrystals.

8. The process of producing semiconductor monocrystals from $A^{II}B^{VI}$ compounds by the process of claim 1, wherein an $A^{II}B^{VI}$ compound and a halogen are employed as the starting materials.

9. The process of producing semiconductor monocrystals from $A^{II}B^{VI}$ compounds by the process of claim

1, wherein the respective elements of the $A^{II}B^{VI}$ compounds separately, and a halogen, are employed as the starting materials.

10. The process of producing semiconductor monocrystals from $A^{II}B^{VI}$ compounds by the process of claim 1, wherein a halide of the $A^{II}$ element, and the $B^{VI}$ element are employed as the starting materials.

11. The process of producing semiconductor monocrystals from $A^{II}B^{VI}$ compounds by the process of claim 1, wherein a halide of the $B^{VI}$ element, and the $A^{II}$ element are employed as the starting materials.

12. The method of claim 1, wherein a halide of at least one of the two elements of the semiconductor compound and the two elements themselves are employed as the starting materials.

13. The process of producing semiconductor monocrystals of $A^{III}B^{V}$ compounds by the process of claim 1, wherein an $A^{III}B^{V}$ compound and a halogen are employed as the starting materials.

14. The process of producing semiconductor monocrystals of $A^{III}B^{V}$ compounds by the process of claim 1, wherein the elements of an $A^{III}B^{V}$ compound separately and a halogen are used as the starting materials.

15. The process of producing semiconductor monocrystals of $A^{III}B^{V}$ compounds by the process of claim 1, wherein a halide of an $A^{III}$ element and the $B^{V}$ element are used as the starting materials.

16. The process of producing semiconductor monocrystals of $A^{III}B^{V}$ compounds by the process of claim 1, wherein a halide of the $B^{V}$ element and the $A^{III}$ element are used as the starting materials.

17. The process of producing semiconductor monocrystals from elements of the fourth *b*-group of the periodic system by the process of claim 1, wherein an element from the fourth *b*-group and a halogen are used as starting materials.

18. The process of producing semiconductor monocrystals from elements of the fourth *b*-group of the periodic system by the process of claim 1, wherein a halide of the fourth group element and the element itself are used as starting materials.

19. The method of claim 1, wherein hydrogen is introduced into the reaction vessel.

References Cited

UNITED STATES PATENTS

| | | | |
|---|---|---|---|
| 2,692,839 | 10/1954 | Christensen et al. | 148—175 |
| 3,025,192 | 3/1962 | Lowe | 148—174 |
| 3,031,403 | 4/1962 | Bennett | 148—1.6 |
| 3,152,022 | 10/1964 | Christensen et al. | 148—175 |
| 3,192,072 | 6/1965 | Ziegler et al. | 148—175 |
| 3,206.406 | 9/1965 | Barkemeyer et al. | 23—204 |

OTHER REFERENCES

Minden: Letter entitled "Leaves of GaAs," Journal of Applied Physics, vol. 33, pp. 243-244, January 1962.

DAVID L. RECK, *Primary Examiner.*

HYLAND BIZOT, *Examiner.*

N. F. MARKVA, *Assistant Examiner.*